(12) United States Patent
Puhala et al.

(10) Patent No.: US 7,789,117 B2
(45) Date of Patent: Sep. 7, 2010

(54) TIRE WITH CIRCUMFERENTIAL RUBBER TREAD HAVING A LATERAL OUTBOARD CONTROL ELEMENT

(75) Inventors: Aaron Scott Puhala, Kent, OH (US); Rachel Rebekah Barnette, Akron, OH (US); David Charles Poling, Uniontown, OH (US); Eric John Marazzi, Tallmadge, OH (US); Kuo-Chih Hua, Richfield, OH (US); Shingo Futamura, Wadsworth, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 912 days.

(21) Appl. No.: 11/651,133

(22) Filed: Jan. 9, 2007

(65) Prior Publication Data

US 2007/0175557 A1 Aug. 2, 2007

Related U.S. Application Data

(60) Provisional application No. 60/762,765, filed on Jan. 27, 2006.

(51) Int. Cl.
*B60C 1/00* (2006.01)
*B60C 11/00* (2006.01)
(52) U.S. Cl. ............... 152/209.4; 152/209.5; 152/209.8
(58) Field of Classification Search .............. 152/209.4, 152/209.5, 209.8
See application file for complete search history.

(56) References Cited

U.S. PATENT DOCUMENTS

| | | | |
|---|---|---|---|
| 4,319,620 A | 3/1982 | Knill | 152/209 R |
| 4,385,653 A | 5/1983 | Okazaki et al. | 152/209 R |
| 4,845,165 A | 7/1989 | Halasa et al. | 526/78 |
| 5,225,011 A | 7/1993 | Takino et al. | 152/209 R |
| 6,025,450 A * | 2/2000 | Lawson et al. | 152/209.1 |

(Continued)

FOREIGN PATENT DOCUMENTS

EP 341187 11/1989

(Continued)

OTHER PUBLICATIONS

European Search Report, completed, (Apr. 2007).

*Primary Examiner*—Steven D Maki
(74) *Attorney, Agent, or Firm*—Henry C. Young, Jr.

(57) ABSTRACT

The invention relates to a tire having a circumferential tread of a cap/base configuration composed of an outer tread rubber cap layer with a running surface of the tread and an underlying tread rubber base layer, wherein said tread cap layer is composed of two longitudinal adjacent zones, namely a primary tread cap zone and a minor lateral outboard control element (zone). The primary tread cap zone and the lateral outboard tread cap element provide a significant gradation of cold dynamic storage moduli (G') at −25° C. and hot tan delta values at 100° C., yet similar warm dynamic storage moduli (G') at 60° C. The primary tread cap zone and lateral outboard control tread cap element are load bearing in the sense of extending from the running surface of the tread radially inward to the unitary (non-zoned) tread base rubber layer. The zoned rubber tread cap layer and unitary rubber tread base layer are an integral tread composite in a sense of being co-extruded. In one aspect of the invention, the primary tread cap zone rubber composition is silica-rich and the lateral, outboard element rubber composition is carbon black-rich and which furthermore provide a gradation of filler reinforcement content; provide a gradation of silica to carbon black ratio and provide a gradation of cis 1,4-polybutadiene rubber content.

16 Claims, 2 Drawing Sheets

U.S. PATENT DOCUMENTS

| | | | |
|---|---|---|---|
| 6,127,468 A | 10/2000 | Cruse et al. | 524/225 |
| 6,204,339 B1 | 3/2001 | Waldman et al. | 525/350 |
| 6,414,061 B1 | 7/2002 | Cruse et al. | 524/262 |
| 6,474,382 B1 | 11/2002 | Finck | 152/209.5 |
| 6,528,673 B2 | 3/2003 | Cruse et al. | 556/427 |
| 6,540,858 B1 | 4/2003 | Caretta et al. | 156/110.1 |
| 6,608,152 B2 | 8/2003 | Ford et al. | 526/138 |
| 6,959,744 B2 | 11/2005 | Sandstrom et al. | 152/209.5 |
| 2002/0033212 A1 | 3/2002 | Caretta et al. | 152/209.5 |
| 2004/0112490 A1 | 6/2004 | Sandstrom | 152/152.1 |
| 2004/0118495 A1* | 6/2004 | Sandstrom et al. | 152/209.5 |
| 2005/0009955 A1* | 1/2005 | Cohen | 524/492 |
| 2005/0167019 A1* | 8/2005 | Puhala et al. | 152/209.5 |
| 2006/0128868 A1* | 6/2006 | Martter et al. | 152/209.5 |

FOREIGN PATENT DOCUMENTS

| | | |
|---|---|---|
| EP | 662396 | 7/1995 |
| EP | 839675 | 5/1998 |
| EP | 864446 | 9/1998 |
| EP | 1308319 | 5/2003 |
| EP | 1428689 A1 | 6/2004 |
| EP | 1431078 A1 | 6/2004 |
| EP | 1561605 A2 | 8/2005 |
| JP | 135309 | 7/1985 |
| JP | 62-059105 * | 3/1987 |
| JP | 1047815 | 2/2001 |
| WO | 9901299 | 1/1999 |
| WO | 00/37270 | 6/2000 |
| WO | 2005/108048 A1 | 11/2005 |

* cited by examiner

TIRE WITH CIRCUMFERENTIAL RUBBER TREAD HAVING A LATERAL OUTBOARD CONTROL ELEMENT

The Applicants hereby incorporate by reference and claim the benefit of prior U.S. Provisional Application Ser. No. 60/762,765, filed on Jan. 27, 2006.

FIELD OF THE INVENTION

The invention relates to a tire having a circumferential tread of a cap/base configuration composed of an outer tread rubber cap layer with a running surface of the tread and an underlying tread rubber base layer, wherein said tread cap layer is composed of two longitudinal adjacent zones, namely a primary tread cap zone and a minor lateral outboard control element (zone). The primary tread cap zone and the lateral outboard tread cap element provide a significant gradation of cold dynamic storage moduli (G') at −25° C. and hot tan delta values at 100° C., yet similar warm dynamic storage moduli (G') at 60° C. The primary tread cap zone and lateral outboard control tread cap element are load bearing in the sense of extending from the running surface of the tread radially inward to the unitary (non-zoned) tread base rubber layer. The zoned rubber tread cap layer and unitary rubber tread base layer are an integral tread composite in a sense of being co-extruded. In one aspect of the invention, the primary tread cap zone rubber composition is silica-rich and the lateral, outboard element rubber composition is carbon black-rich and which furthermore provide a gradation of filler reinforcement content; provide a gradation of silica to carbon black ratio and provide a gradation of cis 1,4-polybutadiene rubber content.

BACKGROUND OF THE INVENTION

Tire treads for pneumatic tires typically have running surfaces of a singular, unitary, rubber composition and consistent physical properties across the face of the tread intended to be ground contacting.

Often the tire tread may be of a cap/base construction composed of an outer tread cap layer presenting the running surface of the tire and an underlying tread base layer as a transition between the tread cap layer and the tire carcass. The tread cap layer itself may be of a lug and groove configuration with the outer surface of the lugs, including lugs in a from of ribs, themselves presenting the running surface of the tire tread. Such overall tire tread cap/base construction is well known to those having skill in such art.

For example, an all-season tire tread cap layer may be of an individual rubber composition designed to present a tread running surface for a balance of a combination of wet traction, cold weather winter traction (for snow and/or ice), dry handling, and resistance to tread wear properties.

However, optimizing one or more individual tread properties such as, for example, wet traction, cold weather winter traction, dry handling and resistance to tread wear properties typically requires a compromise of one or more of the other tread properties.

Tires have been heretofore proposed which have circumferentially zoned treads for various purposes including a desire to present a plurality of individual running surfaces with various characteristics from one tire tread. For example, see U.S. Pat. Nos. 4,319,620, 4,385,653, 6,474,382, 6,540, 858 and 6,959,744; U.S. Patent Application Nos. 2002/ 0033212, 2004/0112490 and 2005/0167019. European patent publication Nos. 0341187, 0662396, 0839675 and 1308319; WO99/01299; and Japanese Patent Publication Nos. 2001/047815 and 85/60135309.

Tire treads have heretofore been mentioned as having running surfaces composed of three longitudinal portions namely, two black colored lateral portions and a non-black colored central portion located between the two black portions, wherein the lateral black colored portions have wear resistant properties virtually identical to the central colored portion (for example: EP0993381 A3, FR2765525 and WO99/01299 patent publications).

In U.S. Pat. No. 5,225,011, a tire is presented having a tread composed of a center rubber composition and side rubbers (its FIG. 1) configured as being positioned directly onto a tire carcass belt without a tread base transition layer. The center rubber is illustrated as being composed of natural rubber or a natural rubber/styrene-butadiene rubber blend. The center rubber contains a carbon black of large iodine absorption number of at least 100 mg/g, silica and silane coupling agent and the side rubbers are required to be of a different rubber composition.

In European patent publication number EP864446A1 a tire is presented, for example, as having a tread (its FIG. 2) with a central portion (B) occupying at least 37 percent of the tread surface and side portions (A) positioned directly onto a tire carcass belt without a tread base transition layer. The side portions may primarily contain, for example, carbon black reinforcement and the central portion may primarily contain, for example, silica reinforcement, wherein the silica content of the central portion (B) is at least 20 percent higher than in the side portions (A).

For the zoned tread cap layer of this invention the tread cap zones are capable of being load-bearing in a sense that the primary and outboard tread cap segments, or zones, extend radially inward from the outer surface of the tread cap layer to the underlying tread base layer rubber composition so that the load on the tire may be communicated by the tread cap layer zones to the transitional tread base layer instead of directly to remainder of the tire carcass itself.

For this invention, it is desired to present an outer tread cap layer with a running surface comprised of two individual circumferential load-bearing zones for the running surface of the tread which exhibit one or more graduated physical properties, and which extend from the outer running surface of the tread cap layer radially inward to said tread base layer.

The tread cap layer is asymmetrical in the sense of the aforesaid primary tread zone and said lateral control element zone of significantly different widths for the span of the tread running surface in a manner that the primary tread cap zone is not centered over the centerline, or equatorial plane, of the tire.

In practice, the significantly narrower lateral outboard control element circumferential tread zone, when the tire is mounted on a rim to form a tire/rim, or wheel, assembly, for an associated vehicle is intended to be positioned axially outward, or outboard, insofar as the associated vehicle is concerned and therefore is referred to herein as an outboard element of the tread cap.

The tread cap is primarily a silica-rich rubber tread cap load bearing layer which contains a minor axially positioned outboard control element, or portion, comprised of a carbon-black rich, silica-containing, rubber composition. For this invention it is intended to maximize the portion of the running surface of the tread cap which is a silica-rich rubber composition and use the relatively minimal axially outboard control element to add a control aspect to the silica-rich primary tread layer (e.g. dry handling and resistance to tread wear by the said lateral outboard tread zone intended to be positioned outboard from the associated vehicle body and therefore referred to herein as the outboard tread cap zone in the sense of being intended to be positioned outboard in relation to its positioning with the associated vehicle) to the silica-rich primary tread layer.

Accordingly, for this invention, the tread cap is required to be primarily composed of a primary cap layer which contains an inclusion of a relatively minimal axially positioned lateral outboard control element which extends over a maximum of only about 30, preferably a maximum of only about 26 percent, of the span of the free running surface of the tread cap in a form of a carbon black-rich, silica-containing, rubber load bearing tread zone, or element, in order to substantially maintain the tread cap layer in a form of a primary silica-rich rubber component which extends over at least 70, preferably at least about 74 percent, of the span of the free running surface of the tread cap.

Regarding elastomer compositions and reinforcing filler for respective primary and outboard control tread cap zones; in practice, the rubber composition of the primary, silica-rich tread cap component, or zone, contains a high reinforcing filler content composed of a combination of precipitated silica and rubber reinforcing carbon reinforcement, with a high content of precipitated silica, in combination with a relatively high content of low Tg (glass transition temperature) cis 1,4-polybutadiene rubber (e.g. about −100° C. to about −106° C.) to promote wet traction (promote tread traction for wet road conditions) and handling under winter conditions (e.g. ice and snow). This is in combination with use of a tin coupled amine functionalized styrene/butadiene elastomer and preferably a capped organoalkoxymercaptosilane coupler for the precipitated silica to aid in coupling the precipitated silica to the diene-based elastomers to promote a reduced viscosity (Mooney ML+4 viscosity property at 100° C.) during the processing (mixing) of the rubber composition.

The rubber composition of the axially outboard control element, component or zone, of the tread cap layer, in one aspect of the invention, contains a reduction of the low Tg polybutadiene rubber content as well as a reduction of the reinforcing filler content (combination of precipitated and rubber reinforcing carbon black), but with a significant increase of the carbon black/silica ratio, to cause the rubber composition to be carbon black-rich (in a sense of the reinforcing filler being primarily composed of the carbon black) to promote dry traction (promote tread traction and tire handling for dry road conditions), as well as resistance to wear, and in combination with the tin coupled, amino functionalized styrene/butadiene elastomer and preferably a capped organomercaptoalkoxysilane coupler for the precipitated silica to aid in coupling the precipitated silica to the diene-based elastomers and in providing a reduced viscosity (Mooney ML+4 viscosity property at 100° C.) during the processing (mixing) of the rubber composition.

Regarding physical properties of the respective primary and outboard control tread cap zones; in practice, it is desired for the cold storage modulus (G') at −25° C. of the rubber composition of the primary tread cap zone to be significantly lower than that of the rubber composition of the outboard control tread cap element, or zone, (for example, by at least 6 MPa and preferably at least about 8 MPa or more) in order that the rubber composition of the primary tread cap zone is relatively softer (not as stiff in the dynamic storage modulus G' sense) than the outboard tread cap control element to promote winter performance.

Also, in practice, it is desired for the warmer dynamic storage modulus (G') at 60° C. of the rubber compositions of the primary tread cap component and outboard tread cap control element to be similar (for example, within about 2 MPa of each other) in order that they have a similar stiffness (in a sense of the dynamic storage modulus G' property) to promote handling for non-winter, dry road conditions.

Further, in practice, it is desired that the rubber composition of the outboard tread cap control element, or zone, is more hysteretic than the rubber composition of the primary tread cap zone, in a sense of its tan delta, 100° C. (3 percent strain and 10 Hertz) in order to promote dry handling grip for the tire (e.g. dry traction when turning the vehicle). Accordingly, in practice, it is preferable that such tan delta property of the rubber composition of the outboard control tread cap element, or zone is at least 8 percent, and preferably at least 10 percent, greater than such tan delta property of the rubber composition of the primary tread cap zone (e.g. is therefore more hysteretic in nature).

Accordingly, the rubber compositions of the strategically positioned primary rubber tread cap and lateral outboard control element of the tread cap layer present a cooperative combination of graduated physical properties across the running surface of the tire in a sense of dynamic storage modulus (G') at +60° C. and at −25° C., as well as the aforesaid tan delta property, for the individual primary zone and control element tread cap rubber compositions.

It is therefore considered herein that one aspect of the invention is for a tire tread cap layer comprised of said primary (silica-rich, relatively high reinforcement-containing and relatively high content of low Tg polybutadiene rubber) rubber tread cap zone and said asymmetrical lateral outboard (carbon black-rich, lower reinforcement-containing and reduced content of low Tg polybutadiene rubber) control tread cap element, or zone, that the aforesaid cold dynamic storage modulus G' (at −25° C.), hot tan delta (at 100° C.) and warm dynamic storage modulus G' (at 60° C.) physical properties relating to the said tread cap layer zones, or segments, are assembled, or combined, in a cooperative manner, particularly by the strategic positioning of outboard control element segment on the outboard position of the primary tread cap zone, to provide the overall tread running surface with suitable gradations of physical properties relating to the aforesaid cold weather winter handling as well as non-winter driving conditions.

The term "axial width" of a free running surface of a tread of a tire, or tread cap layer, means the "axial span of the free running surface" of the tread cap layer, or zone, unless otherwise indicated, as the axial span of the outer surface of such tread cap layer (inflated tire at 75 percent of standard load) which is intended to be ground-contacting under normal straight, (without the vehicle turning), driving conditions, where the axial span includes (spans across) any grooves in the outer surface of the tread cap layer which are not normally intended to be ground contacting. The tire inflation pressures versus standard loads for pneumatic tires may ordinarily be found in the *Tire and Rim Association, Inc Year Book* to determine a standard load for a tire at a chosen inflation pressure (usually the highest inflation pressure listed). For passenger tires, an inflation pressure of 35 psi (240 kPa), is used and for light truck tires (LT) an inflation pressure of 50 psi (343 kPa) is used.

The term "axial width of a total running surface" of a tread of a tire, or tread cap layer, means the "axial span of the total running surface" of the tread cap layer, unless otherwise indicated, as the axial span of the total outer surface of such tread cap layer (usually the front vehicular tire) which is intended to include intermittently ground-contacting when the vehicle is turning, which normally includes said "axial span of the free running surface" and outer portions of both sides of the tread surface which is designed to be intermittently ground-contacting and the included space across the opening of any tread grooves (spans across the grooves) contained in such tread cap layer running surface.

In general, the axial span of the total running surface may be, for example, from about up to about 15, for example from about 5 to about 15, percent greater than the axial span of the free running surface, depending somewhat of the tire's tread cap design as well as the size of the tire and tread itself.

When a tread cap zone is referenced herein as axially spanning a free running surface or total running surface of the tread cap, unless otherwise indicated, such axial span extends axially, or laterally, across such running surface in a direction perpendicular to the equatorial plane (EP) of the tire and therefore does not include the curvature of the tread, or tread cap, itself.

In the description of this invention, the terms "rubber" and "elastomer" where herein, are used interchangeably, unless otherwise provided. The terms "rubber composition", "compounded rubber" and "rubber compound", if used herein, are used interchangeably to refer to "rubber which has been blended or mixed with various ingredients and materials" and such terms are well known to those having skill in the rubber mixing or rubber compounding art. The terms "cure" and "vulcanize" may be used interchangeably unless otherwise provided. In the description of this invention, the term "phr" refers to parts of a respective material per 100 parts by weight of rubber, or elastomer.

The term "Tg", where used herein, refers to the glass transition temperature of an elastomer, which may normally be determined by a differential scanning (DSC) calorimeter with a temperature rise of 10° C. per minute, (ASTM 3418), a method well known to those having skill in such art.

The dynamic storage modulus (G') viscoelastic property, as well a tan delta property (100° C.), of a rubber composition may be obtained using a ARES™-LS2 rheometer from the TA Instruments company of New Castle, Del. (USA) and equipped with a liquid nitrogen cooling device and forced convection oven to allow testing of rubber samples over a broad temperature range below and above ambient temperature. A cylindrical cured rubber sample is used which is approximately 8 millimeters in diameter and approximately 2 millimeters in height glued between two brass cylinders of approximately 8 millimeters in diameter. Such glue may, for example, be a cyanoacrylate based glue. Orchestrator™ software is used to control the ARES™-LS2 rheometer. Using said software, the temperature increase rate of 5° C. is set. A temperature sweep at 3 percent torsional strain and 10 Hertz frequency of from, for example, about −30° C. to about +60° C. is used in which the dynamic storage moduli (G') values may be determined over said temperature range. From said determined dynamic storage moduli (G'), observations are made at −25° C. and +60° C. Use of dynamic storage modulus (G') viscoelastic property to characterize various aspects of cured rubber compositions is well known to those having skill in such art.

SUMMARY AND PRACTICE OF THE INVENTION

In accordance with this invention, a pneumatic tire is provided having a rubber tread of a cap/base construction comprised of an outer, zoned tread cap rubber layer having a (outer) running surface and an underlying internal tread base rubber layer of a unitary (non-zoned) rubber composition, wherein said tread cap layer is comprised of two adjoining (side-by-side) circumferential, longitudinal tread cap rubber zones of graduated physical properties, wherein said tread cap zones individually extend from the running surface of said tread cap layer radially inward to said tread base layer:

wherein said tread cap zones are comprised of a primary tread cap zone and a lateral, outboard control tread cap zone (element); wherein said primary tread cap zone spans from 70 to about 85 percent of the axial width of the free running surface of said tire tread cap layer and wherein said lateral, outboard control tread cap zone spans from about 15 to 30 percent of axial width of the free running surface of said tire tread cap layer and is positioned adjacent to and axially outward from said primary tread cap zone;

wherein the storage modulus G' at −25° C., 3 percent strain and 10 Hertz of the rubber composition of said primary tread cap zone is at least about 6 MPa, preferably at least about 8 MPa, less than such storage modulus G' at −25° C. of said lateral, outboard control tread cap zone;

wherein the storage modulus G' at 60° C., 3 percent strain and 10 Hertz of the rubber composition of said primary tread cap zone is within about 2 MPa (up to about 2 MPa above or below) of such storage modulus G' at 60° C. of said lateral, outboard control tread cap zone;

wherein the tan delta value at 100° C., 3 percent strain and 10 Hertz of the rubber composition of said lateral, outboard tread cap zone is at least 10 percent greater than such tan delta value of the rubber composition of said primary tread cap zone.

In one aspect of the invention, the rubber composition of said primary cap zone is comprised of, based on parts by weight per 100 parts by weight rubber (phr) and so long as said storage moduli G' and tan delta values are met:

(A) 100 phr of at least three conjugated diene-based elastomer(s) comprised of:
  (1) about 40 to about 70, alternately about 50 to about 60, phr of cis 1,4-polybutadiene elastomer,
  (2) about 30 to about 60, alternately about 40 to about 50, phr of organic solution polymerization prepared styrene/butadiene elastomers having a bound styrene content in a range of from about 20 to about 40 percent and a vinyl 1,2-content in a range of from about 20 to about 55 percent comprised of a styrene/butadiene elastomer (SBR-1), and amine functionalized styrene/butadiene elastomer (SBR-2), with a weight ratio of said SBR-1 to said SBR-2 in a range of from about 70/30 to about 40/60, alternately in a range of from about 60/40 to about 40/60;

(B) reinforcing filler in a range of from about 90 to about 135 phr comprised of:
  (1) precipitated silica in a range of from about 75 to about 120 phr, and
  (2) rubber reinforcing carbon black in a range of from about zero to about 15, alternately from about 5 to about 15 phr, and (C) coupling agent for said silica having a moiety reactive with hydroxyl groups (e.g. silanol groups) contained on the surface of said precipitated silica another moiety interactive with diene-based elastomers;

wherein the rubber composition of said lateral outboard tread cap zone is comprised of, based on parts by weight per 100 parts by weight rubber (phr) and so long as said storage modulus G' values are met:

(D) 100 phr of at least two conjugated diene-based elastomer(s);
  (1) from zero to about 40, alternately from about 10 to about 40 phr of cis 1,4-polybutadiene elastomer,
  (2) about 60 to about 100, alternately about 60 to about 90, phr of organic solution polymerization prepared styrene/ butadiene elastomers having a bound styrene content in a range of from about 20 to about 40 percent and a vinyl 1,2-content in a range of from about 20 to about 55 percent comprised of a styrene/butadiene elastomer (SBR-1), and amine functionalized styrene/butadiene elastomer (SBR-2), with a weight ratio of said SBR-1 to said SBR-2 in a range of from about 70/30 to about 40/60, alternately in a range of from about 60/40 to about 40/60;

(E) reinforcing filler in a range of from about 50 to about 120 phr, wherein the content of said reinforcing filler is at least 10, preferably at least about 15, phr less than the content of reinforcing filler of the rubber composition of said primary tread cap zone, comprised of:
   (1) precipitated silica within a range of from about zero to about 45, alternately from about 5 to about 45, phr, and
   (2) rubber reinforcing carbon black within a range of from about 30 to about 120, alternately from about 30 to about 115 phr, wherein the content of said rubber reinforcing carbon black content is at least 5 phr greater than the content of said aid precipitated silica, and (F) coupling agent for said silica having a moiety reactive with hydroxyl groups (e.g. silanol groups) contained on the surface of said precipitated silica another moiety interactive with diene-based elastomers.

Accordingly, as an example of the reinforcing filler content of the respective rubber compositions in the primary and lateral tread cap zones, in the sense that the rubber composition of said lateral, outboard tread cap zone contains reinforcing filler content less than that of the said primary tread cap zone, and which is carbon black-rich, if total reinforcing filler content in the rubber composition of the primary tread cap zone should be 90 phr, then the total reinforcing filler in the rubber composition of the lateral, outboard tread cap zone is a maximum of 80 phr. The reinforcing filler in the lateral, outboard tread cap may therefore be composed of, for example, a low 5 silica content and 75 phr carbon black or up to a high 37.5 phr silica content with 42.5 phr of carbon black, taking into consideration that the rubber composition of the lateral tread cap zone is to contain at least 5 phr more of the rubber reinforcing carbon black than the precipitated silica, and all provided that the said storage moduli (G') and tan delta values are met.

In practice, the rubber composition of said primary tread cap zone preferably has a cold dynamic storage modulus (G') at −25° C., 3 percent strain and 10 Hertz in a range of about 10 to about 30 MPa and a warm dynamic storage modulus (G') at 60° C., 3 percent strain and 10 Hertz in a range of from about 3.5 to about 5.5 MPa.

In practice, the rubber composition of said lateral, outboard control tread cap zone (element) has a cold dynamic storage modulus (G') at −25° C., 3 percent strain and 10 Hertz in a range of about 25 to about 100, alternately from about 25 to about 50, MPa and warm dynamic storage modulus (G') at 60° C., 3 percent strain and 10 Hertz in a range of from about 2 to about 4 MPa.

In practice, while the tan delta (100° C.) at 3 percent strain and 10 Hertz values may vary considerably, typically it is desirable for such tan delta value of said lateral, outboard control tread cap zone to be in a range of from about 0.15 to about 0.35 and for such tan delta of the rubber composition of said primary tread cap zone to be in a range of from about 0.05 to about 0.25, wherein the tan delta value of said lateral, outboard control tread cap zone is at least 10 percent greater (higher) than the tan delta value of said primary tread cap zone.

In practice, if desired, the aforesaid rubber compositions of said primary tread cap zone and lateral outboard tread cap zones may contain at one additional elastomer, preferably a conjugated diene-based elastomer such as, for example, from about 5 to about 15 phr thereof so long as said dynamic storage moduli values at −25° C. and 60° C. as well as said tan delta values at 100° C., are met.

In practice, as hereinbefore discussed, the lateral tread zone is referred to as an outboard control element for the tread in a sense of the tread being intended to be positioned on a vehicle with the lateral carbon black-rich rubber control element of the silica-rich tread cap being positioned axially outboard of the associated vehicle (as opposed of being positioned axially inboard and thereby next to the vehicle) in order to promote dry handling control for the tire tread. Therefore, it is therefore considered herein to be properly referred to as being an "outboard control element" for the tire tread cap layer.

In practice, the aforesaid individual rubber compositions of the respective primary and lateral outboard zones of said zoned tread cap layer, together with said tread base rubber layer, are considered herein as being an integral tread composite in a sense of being co-extruded.

In one aspect of the invention, the junctions of said primary and outboard control element lateral tread cap zones are preferably positioned within circumferential grooves located between said zones.

As previously discussed, the invention is directed to a tire tread of a cooperative combination of a cap/base structural configuration, with an asymmetrically dual zoned tread cap layer with its lateral control element, having graduated physical properties (storage moduli G' at cold and warm temperatures and hot tan delta values), which in a further aspect, depends upon an aforesaid combination of cooperative compositional requirements (elastomer and reinforcement content and variation). This is a significant contrast to providing a tire tread, particularly a tread cap of a tread of cap/base construction, of a unitary tread running surface rubber composition. As hereinbefore discussed, a significant difficulty of providing such a unitary tread running surface relates to compromises in providing such a tread surface with physical properties suitable for traction and/or handling over broad range of driving conditions. By the practice of this invention of strategic positioning selective tread cap segments of graduated physical properties across the face of the running surface of the tire tread, namely a primary tread cap zone and a lateral, outboard control element tread cap segment, or zone, such compromises are both minimized and the otherwise compromised physical limitations of selected regions of the tread running surface are advantageously emphasized insofar as traction and handling characteristics of the tire over a relatively wide range of conditions.

It is considered herein that rubber compositions with said viscoelastic properties, namely said storage moduli G' and tan delta values, can be obtained with routine evaluation by one having skill in such rubber compounding art without undue experimentation.

In one alternative aspect of the invention, one or more of said individual tread cap zone rubber compositions, particularly said lateral outboard control element segment, rubber composition, may contain from about 1 to about 15, alternately about 2 to about 10, phr of short fibers selected from, for example, at least one of glass, polyester, nylon, aramid, carbon, rayon and cotton fibers, preferably glass fibers. Such short fibers may have an average diameter, for example, in a range of from about 10 to about 50 microns and an average length, for example, in a range of from about 0.5 to about 5 mm.

In one alternative aspect of the invention, one or more of said individual tread cap segment rubber compositions, whether said primary tread cap zone and/or said lateral control tread cap zone, particularly said primary tread cap zone rubber composition, may contain from about 1 to about 5, alternately about 1 to about 4, phr of particulate inorganic or organic granules, in addition to said rubber reinforcing carbon black and said precipitated silica, having an average diameter considerably larger than the typical average diameter of said rubber reinforcing carbon black and precipitated silica in a range, for example, of from about 50 to about 200 microns. Representative of such particulate granules are, for example and not intended to be limiting, particulate inorganic minerals, particulate agricultural plant-derived particles, engineered (manufactured) organic and inorganic polymeric particles. Such particulate materials may be, for example, and not intended to be limiting, ground nut shells, hollow glass spheres, ground nylon, aramid and polyester polymers, and ground inorganic mineral composites such as for example aluminum silicate (pumice).

In practice, said tread base rubber layer is typically of a unitary, single rubber composition (rather than being a segmented, or zoned, rubber layer of a plurality of rubber compositions) comprised of at least one conjugated diene-based elastomer. For example, the tread base rubber layer may be comprised of at least one conjugated diene-based elastomer and from about 30 to about 70 phr of rubber reinforcing filler selected from carbon black or a combination of and precipitated silica and carbon black comprised of from about 30 to about 70, alternately from about 25 to about 65, phr of carbon black and from zero to 25, alternately about 5 to about 20, phr of precipitated silica, (thus, in one aspect, the rubber reinforcing filler may be, and in general is preferably, entirely rubber reinforcing carbon black).

In this manner, then, the tire tread is presented as the zoned tread cap layer (the asymmetrically configured primary tread cap zone and adjoining lateral outboard tread cap element, or zone) which extends radially inward to and terminates with an underlying, supporting unitary (non-zoned) tread base rubber layer.

Representative examples of conjugated diene-based elastomers for said tread base rubber layer are, for example, cis 1,4-polyisoprene rubber (usually preferably natural rubber) which may, if desired, be used in combination with another diene based elastomer such as for example, cis 1,4-polybutadiene rubber and/or isoprene/butadiene rubber.

In practice, representative examples of said additional conjugated diene-based elastomers for said rubber compositions of said primary and lateral outboard control element tread cap zones, provided that such rubber compositions present the required dynamic storage moduli (G') at −25° C. and 60° C., for example and based upon parts by weight per parts by weight rubber (phr) are comprised of, for example, at least one of cis 1,4-polyisoprene rubber, isoprene/butadiene rubber, trans 1,4-polybutadiene, low vinyl polybutadiene having vinyl content in a range of 5 to about 20 percent, high vinyl polybutadiene having a vinyl content in a range of from about 20 to about 90 percent, 3,4-polyisoprene, and styrene/isoprene/butadiene rubber.

Said amine functionalized, high vinyl, styrene/butadiene elastomer (SBR-2), is preferably introduced as a partially tin coupled elastomer (e.g. about 20 to about 35 percent tin coupled) when blended with the rubber composition. However, it is understood herein that such tin coupling is typically substantially destroyed during the processing by high shear mixing of the unvulcanized rubber composition prior to fabrication of the tread strip onto tire carcass itself and subsequent molding and curing of the tire assembly to form the resultant tire.

The amine substituents for the amine functionalized elastomer (SBR-2) are envisioned herein as being typically comprised of at least one of primary and secondary amine groups, preferably comprised of secondary amine groups, such as, for example, N-methyl amine based groups (and/or derivatives). Such amine groups might, for example, be derived from an N-methyl pyrollidone during the polymerization of the styrene and 1,3-butadiene monomers in the presence of, for example, a lithium based catalyst. In such polymerization, the amine substituent is envisioned herein as being located at the end of the elastomer chain, at the beginning of the elastomer chain and/or within the elastomer chain. Accordingly, the amine functionalized styrene/butadiene elastomer (SBR-2) might be referred to as an amine functionalized styrene/butadiene elastomer containing amine substituents comprised of at least one of primary and secondary, preferably comprised of secondary, amine groups. Such amine substituents may, for example, be distributed on (at either and/or both ends and within the elastomer chain itself) the elastomer chain.

The tin coupling itself may be provided, for example, by in situ tin coupling within and during the polymerization process. In this manner, the elastomer may be only partially tin coupled to an extent, for example, in a range of from 25 to about 35 percent tin coupled.

A discussion relating to in situ tin coupling of elastomers may be found, for example, in U.S. Pat. No. 4,845,165.

A representative example of a contemplated partially tin coupled, amine functionalized styrene/butadiene elastomer for use in this invention is, for example, SE SLR-4601™ from Dow Chemical.

As hereinbefore discussed, an aspect of the invention is the inclusion of the respective tread cap zones within the rubber tread cap layer itself with the underlying and, co-extruded rubber tread base itself being of a singular rubber composition and not composed of a plurality of individual zones. Thus, the individual circumferential load bearing tread cap zones extend radially inward from the tread cap running surface to the underlying, and supportive, transitional, tread base layer in contrast to extending directly to the tire carcass.

In the practice of this invention, the synthetic amorphous silica in the form of a precipitated silica, may be composed of aggregates of precipitated silica, which is intended to include precipitated aluminosilicates as co-precipitated silica and aluminum.

Such precipitated silica is, in general, well known to those having skill in such art. For example, such precipitated silica may be precipitated by controlled addition of an acid such as, for example, hydrochloric acid or sulfuric acid, to a basic solution (e.g. sodium hydroxide) of a silicate, for example, sodium silicate, usually in the presence of an electrolyte, for example, sodium sulfate. Primary, colloidal silica particles typically form during such process which quickly coalesce to form aggregates of such primary particles and which are then recovered as precipitates by filtering, washing the resulting filter cake with water or an aqueous solution, and drying the recovered precipitated silica. Such method of preparing precipitated silica, and variations thereof, are well known to those having skill in such art.

The precipitated silica aggregates preferably employed in this invention are precipitated silicas such as, for example, those obtained by the acidification of a soluble silicate, e.g., sodium silicate and may include co-precipitated silica and a minor amount of aluminum.

Such silicas might have a BET surface area, as measured using nitrogen gas, for example, in a range of about 40 to about 600, and more usually in a range of about 50 to about 300 square meters per gram. The BET method of measuring surface area is described in the *Journal of the American Chemical Society*, Volume 60, Page 304 (1930).

The silica may also have, for example, dibutylphthalate (DBP) absorption value in a range of about 50 to about 400 $cm^3/100$ g, and more usually about 100 to about 300 $cm^3/100$ g.

Various commercially available precipitated silicas may be considered for use in this invention such as, only for example herein, and without limitation, silicas from PPG Industries under the Hi-Sil trademark with designations Hi-Sil 210, Hi-Sil 243, etc; silicas from Rhodia as, for example, Zeosil 1165MP and Zeosil 165GR, silicas from J. M. Huber Corporation as, for example, Zeopol 8745 and Zeopol 8715, silicas from Degussa AG with, for example, designations VN2, VN3 and Ultrasil 7005 as well as other grades of precipitated silicas, which can be used for elastomer reinforcement.

A coupling agent is utilized with the silica to aid in its reinforcement of the rubber composition which contains the silica. Such coupling agent conventionally contains a moiety reactive with hydroxyl groups on the silica (e.g. precipitated silica) and another and different moiety interactive with the diene hydrocarbon based elastomer.

In practice, said coupling agent may be, for example, (A) a bis-(3-triethoxysilylpropyl)polysulfide having an average of from 2 to about 4 and more preferably an average of from 2 to about 2.6 or from about 3.4 to about 4, connecting sulfur atoms in its polysulfidic bridge, or (B) a bis-(3-triethoxysilylpropyl)polysulfide having an average of from about 2 to about 2.6 connecting sulfur atoms in its polysulfidic bridge and a bis-(3-triethoxysilylpropyl) polysulfide having an average of from about 3.4 to about 4 connecting sulfur atoms in its polysulfidic bridge, wherein said polysulfide having an average of from 2 to about 2.6 connecting sulfur atoms in its polysulfidic bridge (to the exclusion of such polysulfide having an average of from 3 to 4 connecting sulfur atoms in its polysulfidic bridge) is blended with said rubber composition in the absence of sulfur and sulfur vulcanization accelerator and wherein said polysulfide having an average of from about 3.4 to about 4 connecting sulfur atoms in its polysulfidic bridge is thereafter blended with said rubber composition in the presence of sulfur and at least one sulfur vulcanization accelerator, or (C) an organoalkoxymercaptosilane composition of the general Formula (I) represented as:

$(X)_n(R_7O)_{3-n}$—Si—R—SH    (I)

wherein X is a radical selected from a halogen, namely chlorine or bromine and preferably a chlorine radical, and from alkyl radicals having from one to 16, preferably from one through 4, carbon atoms, preferably selected from methyl, ethyl, propyl (e.g. n-propyl) and butyl (e.g. n-butyl) radicals; wherein $R_7$ is an alkyl radical having from 1 through 18, alternately 1 through 4, carbon atoms preferably selected from methyl and ethyl radicals and more preferably an ethyl radical; wherein $R_8$ is an alkylene radical having from one to 16, preferably from one through 4, carbon atoms, preferably a propylene radical; and n is an average value of from zero through 3, preferably zero, and wherein, in such cases where n is zero or 1, $R_7$ may be the same or different for each $(R_7O)$ moiety in the composition, and (D) said organalkoxyomercaptosilane of the general Formula (I) capped with a moiety which uncaps the organoalkoxymercaptosilane upon heating to an elevated temperature.

Representative examples various organoalkoxymercaptosilanes are, for example, triethoxy mercaptopropyl silane, trimethoxy mercaptopropyl silane, methyl dimethoxy mercaptopropyl silane, methyl diethoxy mercaptopropyl silane, dimethyl methoxy mercaptopropyl silane, triethoxy mercaptoethyl silane, tripropoxy mercaptopropyl silane, ethoxy dimethoxy mercaptopropylsilane, ethoxy diisopropoxy mercaptopropylsilane, ethoxy didodecyloxy mercaptopropylsilane and ethoxy dihexadecyloxy mercaptopropylsilane.

Such organoalkoxymercaptosilanes may be capped with various moieties as discussed above.

A representative example of a capped organoalkoxymercaptosilane coupling agent useful for this invention is a liquid 3-octanoylthio-1-propyltriethoxysilane as NXT™ Silane from the GE Silicones Company.

Exemplary organoalkoxymercaptosilanes may be found, for example, in U.S. Pat. Nos. 6,127,468, 6,204,339, 6,414, 061, 6,528,673 and 6,608,152.

The coupling agent may, for example, be added directly to the elastomer mixture or may be added as a composite of precipitated silica and such coupling agent formed by treating a precipitated silica therewith or by treating a colloidal silica therewith and precipitating the resulting composite.

For example, said silica (e.g. precipitated silica), or at least a portion of said silica, may be pre-treated prior to addition to said elastomer(s):

(A) with an with an alkylsilane of the general Formula (II), or (B) with said bis(3-triethoxysilylpropyl)polysulfide having an average of from about 2 to about 4 connecting sulfur atoms in its polysulfidic bridge, or (C) with said organomercaptosilane of the general Formula (I), or (D) with a combination of said alkylsilane of general Formula (I) and said bis(3-triethoxysilylpropyl)polysulfide having an average of from about 2 to about 4 connecting sulfur atoms in its polysulfidic bridge, or (E) with a combination of said alkylsilane of general Formula (II) and said organomercaptosilane of general Formula (I);

wherein said alkylsilane of the general Formula (II) is represented as:

$X_n$—Si—$R_{6(4-n)}$    (II)

wherein $R_6$ is an alkyl radical having from 1 to 18 carbon atoms, preferably from 1 through 4 carbon atoms; n is a value of from 1 through 3; X is a radical selected from the group consisting of halogens, preferably chlorine, and alkoxy groups selected from methoxy and ethoxy groups, preferably an ethoxy group.

A significant consideration for said pre-treatment of said silica is to reduce, or eliminate, evolution of alcohol in situ within the rubber composition during the mixing of the silica with said elastomer such as may be caused, for example, by reaction such coupling agent contained within the elastomer composition with hydroxyl groups (e.g. silanol groups) contained on the surface of the silica.

In practice, said rubber reinforcing carbon black for said rubber compositions of said tread cap zones are preferably relatively high reinforcing rubber reinforcing carbon blacks having an Iodine absorption value (ASTM D-1510) in a range of from about 110 to about 140 g/kg and a DBP adsorption value (ASTM D-2414) in a range of from about 100 to about 150 cc/100 g. Representative examples of such carbon blacks, according to their ASTM designations which may be found in *The Vanderbilt Rubber Handbook*, 13$^{th}$ Edition (1990) on Pages 416 and 417, are, for example, N110, N120, N121, N134, N220, N231, N234 and N299.

In practice, the invention the rubber compositions may be prepared, for example, in a sequential series of at least two separate and individual preparatory internal rubber mixing steps, or stages, in which the diene-based elastomer is first mixed with the prescribed carbon black and/or silica in a subsequent, separate mixing step and followed by a final mixing step where curatives are blended at a lower temperature and for a substantially shorter period of time.

It is conventionally required after each mixing step that the rubber mixture is actually removed from the rubber mixer and cooled to a temperature of less than 40° C. and, for example, in a range of about 40° C. to about 20° C. and then added back to an internal rubber mixer for the next sequential mixing step, or stage.

The forming of a tire component is contemplated to be by conventional means such as, for example, by extrusion of rubber composition to provide a shaped, unvulcanized rubber component such as, for example, a tire tread. Such forming of a tire tread is well known to those having skill in such art.

It is understood that the tire, as a manufactured article, is prepared by shaping and sulfur curing the assembly of its components at an elevated temperature (e.g. 140° C. to 180° C.) and elevated pressure in a suitable mold. Such practice is well known to those having skill in such art.

It is readily understood by those having skill in the art that the rubber composition would be compounded by methods generally known in the rubber compounding art, such as mixing the various sulfur-vulcanizable constituent rubbers with various commonly used additive materials, as herein before discussed, such as, for example, curing aids such as sulfur, activators, retarders and accelerators, processing additives, such as rubber processing oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical amounts of fatty acids, if used which can include stearic acid, comprise about 0.5 to about 3 phr. Typical amounts of zinc oxide comprise about 1 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1.5 to about 2.5, sometimes from about 2 to about 2.5, being preferred.

Accelerators are used to control the time and/or temperature required for vulcanization and to improve the properties of the vulcanizate. In one embodiment, a single accelerator system may be used, i.e., primary accelerator. A primary accelerator(s) may be used, for example, in an amount ranging from about 0.5 to about 5, alternately about 0.8 to about 4, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a secondary accelerator is used, it may be, for example, be a guanidine, dithiocarbamate or thiuram compound.

The mixing of the rubber composition can, for example, be accomplished by the aforesaid sequential mixing process. For example, the ingredients may be mixed in at least one sequential non-productive (preparatory) mixing stage followed by a productive (final) mix stage. The final curatives are typically mixed in the final stage which is conventionally called the "productive" or "final" mix stage in which the mixing typically occurs at a temperature, or ultimate temperature, lower than the mix temperature(s) of the preceding non-productive mix stage(s). The terms "non-productive" and "productive" mix stages are well known to those having skill in the rubber mixing art.

BRIEF DESCRIPTION OF THE DRAWINGS

For a further understanding of the invention, drawings are provided. In particular.

THE DRAWINGS

Figure 1:
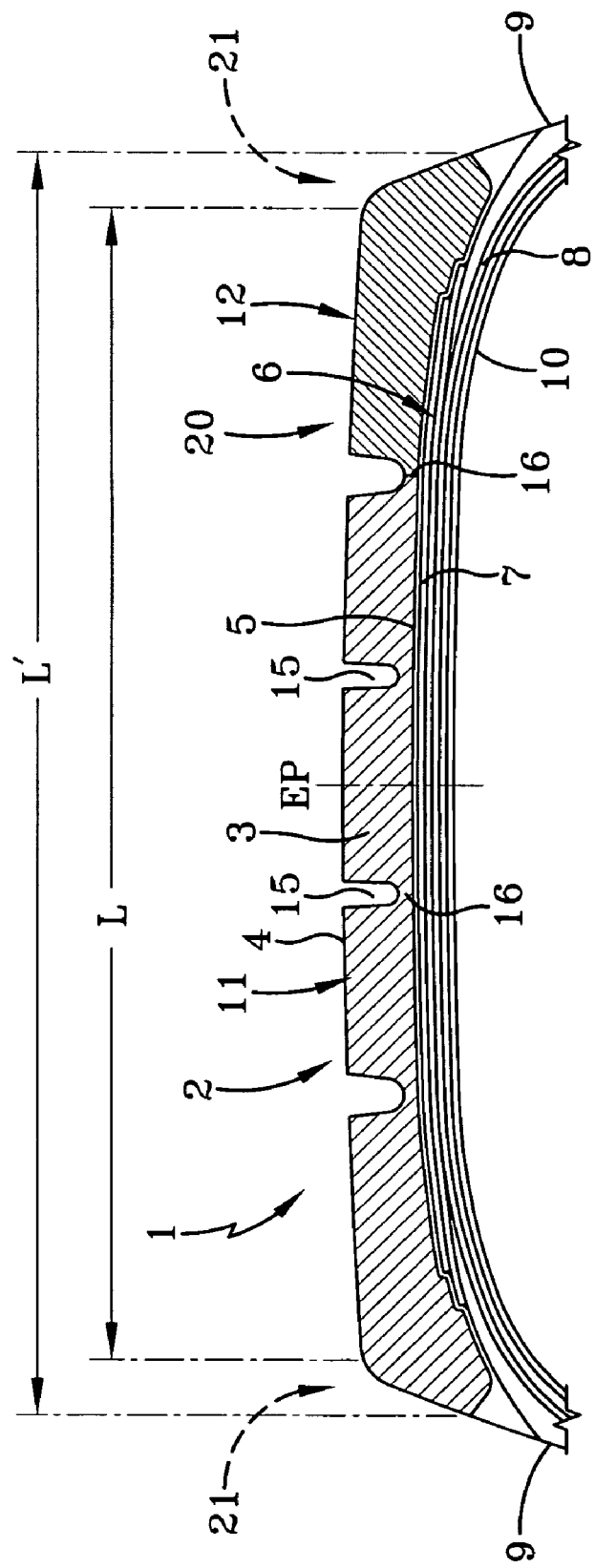
FIG. 1 is provided as depicting a partial cross-sectional view of a cap/base configured tread portion of a pneumatic tire.

FIG. 1 is provided as depicting a partial cross-sectional view of a tire having a tread of a cap/base construction where the outer tread cap layer is presented with a primary tread cap zone together with an outboard control tread cap zone of graduated physical properties wherein the primary tread cap zone occupies about 75 percent of the span of the free running surface (L) of the tread.

In particular, FIG. 1 represents a partial cross-section of a tire (1) having a tread (2) comprised of an outer tread cap layer (3) having a running surface (4) intended to be ground-contacting and underlying tread base layer (5) as a transition zone between said tread cap layer (3) and tire carcass (6) which may include a rubber encapsulated belt layer (7); two spaced apart relatively inextensible beads (not shown) to accommodate mounting the tire on a rigid rim (not shown), carcass plies as rubber encapsulated fabric reinforced plies (8) extending between said beads through a crown region of the tire (1), a pair of partially shown sidewalls (9) individually extending between said beads and outer, peripheral edges of said tread (2) and a rubber innerliner layer (10).

Said tread cap layer (3) is comprised of two circumferential (side-by-side) longitudinal zones of rubber compositions of graduated physical properties. Said tread cap zones extend from the outer running surface (4) of the tread cap layer (3) radially inward to the underlying rubber tread base layer (5) which does not contain the aforesaid zones of the tread cap zones.

Said zones of said tread cap layer (3) are comprised of a primary zone (11) and a lateral, outboard control element, tread cap zone positioned adjacent to and axially outward from the primary tread zone (11) (exclusive of additional tread cap zone or zones).

Divisional junctions (16) are provided between the primary tread cap zone (11) and the lateral tread cap zone control element (12) which are located within the circumferential grooves (15).

The primary tread cap zone (11) spans, for example, about 75 percent of the span (L) of the free running surface (4) of the tire tread cap layer (3), which includes the spaces (14) across the openings of any included grooves, including the circumferential grooves (15). The lateral tread cap zone (12) thereby spans, for example, about 25 percent of the said span (L) of the free running surface (4) of the tire tread cap layer (3).

The span (L) represents the axial width of the span of the free running surface of the tread and the span (L') represents the axial width of the span of the total running surface of the tread which includes the additional running surface of the tread cap under tire cornering conditions. The axial span (L) of the free running surface of the tread and axial span (L') of the total running surface of the tread is for the inflated tire operating under 75 percent of its standard load according to the *Tire and Rim Association, Inc. Year Book*", using an inflation pressure of 35 psi (240 kPa) for a passenger tire (e.g. P-metric passenger tire size 225/55R16 standard load would be 670 kg of which 75 percent thereof would be 503 kg) An inflation pressure of 50 psi, or 343 kPa, would have been used for a light truck tire (LT) operating under 75 percent of its standard load according to said "Year Book". Under cornering conditions (where the tire is a front, steering tire and the associated vehicle on which the tire is mounted, it intended that at least a portion of the running surfaces of one of the lateral tread cap zones (13) comes in contact, albeit intermittently, with the ground to thereby present at least a portion of an axially extended running surface (L') to the road and thereby provides increased grip for the tire tread). The axial span of the total running surface (L') is illustrated as being a total of about 10 percent greater than the span of the free running surface (L).

For the drawing, the dynamic storage moduli (G') at 60° C., 3 percent strain and 10 Hertz for the rubber composition of the primary tread cap zone (11) and the rubber composition of the lateral, outboard tread cap zone (12) are presented as being within about 2 MPa of each other.

Figure 2:
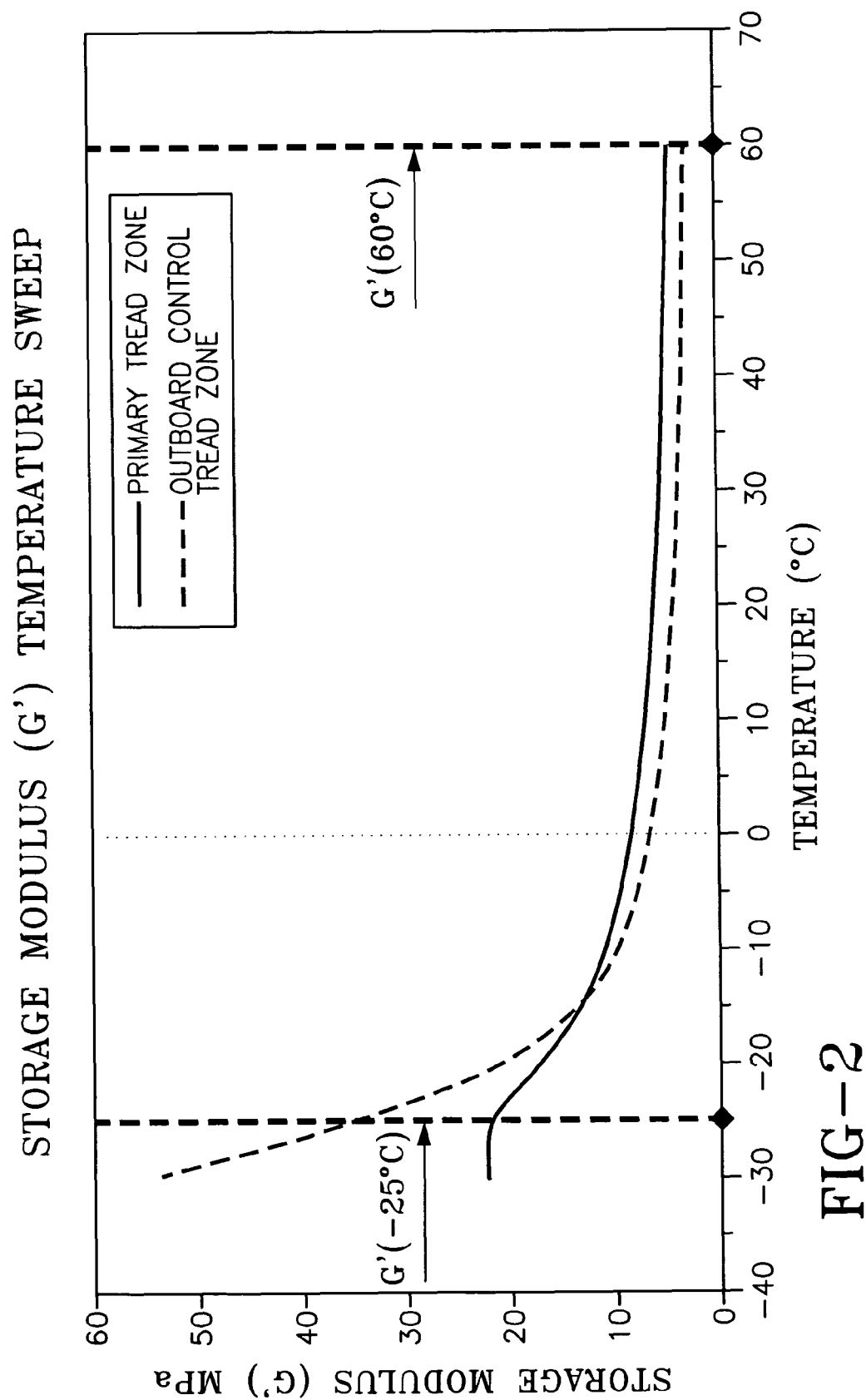
FIG. 2 is a graphical presentation of temperature sweep for dynamic storage modulus (G') values.

In particular, FIG. 2 is a graphical presentation a temperature sweep of dynamic storage modulus (G') over temperature range of from −30° C. to +60° C. with representative G' values reported in MPa for the rubber composition of the primary tread cap zone and the lateral, control tread cap zone. The G' temperature sweep was conducted according to the hereinbefore discussed ARES™-LS2 rheometer methodology. Observation points are indicated at −25° C. and at +60° C. for the respective representative G' values at those temperatures on the depicted temperature sweep graph.

The following examples serve to illustrate the invention in further detail but are not intended to limit the invention. The amounts, or parts, and percentages are by weight unless otherwise indicated.

EXAMPLE I

Samples of rubber compositions were prepared for primary and control element (lateral) tread cap zone(s) of a circumferentially asymmetrically zoned tread cap layer of a tire tread of cap/base construction.

The rubber samples are referred to in this Example as Sample A (for a rubber composition for a primary tread cap zone), and Sample B (for a rubber composition for a lateral outboard control element tread cap zone).

The rubber compositions were prepared in an internal rubber mixer using several mixing stages, namely, three individual sequential non-productive mix stages, in which ingredients are mixed and blended, except for sulfur curative and vulcanization accelerator(s), for about 5 to 6 minutes to a temperature of about 150° to 170° C., depending somewhat upon the mixing stage and the rubber mixture being mixed, dumped from the mixer, sheeted out and allowed to cool to below 40° C. between non-productive mixing stages and following the last non-productive mixing stage.

The resulting rubber composition is then mixed in a productive mixing stage in an internal rubber mixer, in which sulfur curative and accelerators are added, for between about 1 and 3 minutes to a temperature of between about 100 and 120° C., depending somewhat upon the rubber mixture being mixed.

Mixing rubber compositions in a series of individual and sequential non-productive and productive mixing stages is well known to those having skill in such art.

Ingredients used in the rubber Samples are illustrated in the following Table 1.

TABLE 1

| Material | Primary Zone Sample A | Lateral, Outboard Control Zone Sample B |
|---|---|---|
| Non-Productive Mix Stages | | |
| Cis 1,4-polybutadiene rubber[1] | 46 | 33 |
| High vinyl styrene/butadiene rubber[2] | 25 | 33.5 |
| Styrene/butadiene rubber (dry weight)[3] | 29 | 33.5 |
| Carbon black (N120)[4] | 10 | 27 |
| Silica[5] | 110 | 63 |
| Coupling agent, blocked type[6] | 13.2 | 2.3 |
| Rubber processing oil[7] | 34.9 | 32.6 |
| Fatty acid[8] | 2 | 2 |
| Antidegradant[9] | 2 | 2 |
| Wax[10] | 1.5 | 1.5 |
| Coumarone indene resin | 0 | 5.6 |
| Productive Mix Stage | | |
| Sulfur | 1 | 0.75 |
| Zinc oxide | 2 | 2 |
| Accelerator(s)[11] | 6 | 3.8 |

[1]Cis 1,4-polybutadiene rubber obtained by organic solvent solution polymerization having a cis 1,4-content of greater than 95 percent and a Tg of about −105° C. obtained as Budene 1208 from The Goodyear Tire & Rubber Company
[2]Tin coupled, amine functionalized, organic solvent solution polymerization prepared styrene/butadiene copolymer elastomer, using lithium initiator, containing about 21 percent bound styrene based upon the elastomer, having about a 50 percent vinyl content based upon the elastomer obtained as SE SLR-4601 ™ from Dow Chemical.
[3]Styrene/butadiene copolymer elastomer, organic solvent solution polymerization prepared, containing about 33 percent bound styrene, having about a 23 percent vinyl content based upon the total elastomer and having a Tg of about −36° C. obtained from The Goodyear Tire & Rubber Company which contained about 37.5 parts by weight extender oil per 100 parts by weight of the elastomer and is reported on a dry weight basis (without the extender oil) in Table 1.
[4]N-120 carbon black, an ASTM designation
[5]Synthetic, amorphous, precipitated silica obtained as Zeosil 1165MP from the Rhodia Company
[6]A capped organoalkoxymercaptosilane silica coupling agent as 3-octanoylthio-1-propyl-triethoxysilane as NXT ™ Silane from the GE Silicones Company
[7]Rubber processing oil (free oil added to the mixture) plus the oil contained in the oil extended styrene/butadiene elastomer
[8]Primarily stearic acid
[9]Of the paraphenylene diamine type
[10]Microcrystalline wax
[11]N-tert butyl-2-benzothiazyl sulfenamide and diphenyl guanidine Various physical properties for rubber Samples of Table 1 are reported in the following Table 2. The Samples were cured at a temperature of about 160° C. for about 14 minutes.

TABLE 2

| Material | Primary Zone Sample A | Lateral, Outboard Control Zone Sample B |
|---|---|---|
| Precipitated silica | 110 | 27 |
| Carbon black | 10 | 63 |
| Total reinforcing filler (carbon black and silica) | 120 | 90 |
| Polybutadiene rubber | 46 | 33 |
| 300% modulus (ring) (MPa) | 10.7 | 8.3 |
| Ultimate tensile strength (MPa) | 13.4 | 15.5 |
| Ultimate elongation (%) | 400 | 526 |
| Shore A hardness (23° C.) | 72 | 64 |
| Zwick Rebound (23° C.) | 48 | 45 |

EXAMPLE II

A tire of size P225/55R16 was prepared having a tread of a cap/base construction with the tread cap layer providing a running surface of the tire and composed of an asymmetrically configured longitudinal (side-by-side) primary and outboard control element tread cap zones in a manner shown in FIG. 1 with a longitudinal groove positioned between said primary and outboard control tread cap zones. The primary tread cap width spanned about 75 percent, and the lateral, control tread zone width spanned about 25 percent, of the free running surface of the tire tread in a manner shown in FIG. 1.

The primary and lateral tread cap zone rubber compositions were of rubber compositions represented by Samples A and B, respectively, of Example I.

The storage moduli (G') were evaluated for the respective primary and lateral, outboard, control element zones of rubber samples taken from the tire and reported in the following Table 3.

TABLE 3

| Material | Primary Zone Sample A | Outboard, Control Element Zone Sample B |
|---|---|---|
| Precipitated silica | 110 | 27 |
| Carbon black | 10 | 63 |
| Total reinforcing filler (carbon black and silica) | 120 | 90 |
| Polybutadiene rubber | 46 | 33 |
| Dynamic storage modulus (G')[1], (−25° C.), MPa | 21.8 | 34.6 |
| Dynamic storage modulus (G')[1], (60° C.), MPa | 4.5 | 2.9 |
| Tan delta[1], (100° C.) | 0.17 | 0.20 |

[1]Observed from a temperature versus viscoelastic property sweep as hereinbefore described with said ARES ™ - LS2 rheometer operated at a 3 percent torsional strain and 10 Hertz frequency, the methodology of which is hereinbefore discussed.

The tan delta property (100° C.) of the rubber composition of the lateral, outboard tread cap zone (0.20) is about 17 percent higher than the tan delta property of the rubber composition of the primary tread cap zone (0.17) which is indicative of a higher hysteretic property of the rubber composition of the lateral, outboard tread cap zone, which is considered herein to be indicative of the promotion of the aforesaid dry grip property for the running surface of the lateral, outboard tread cap zone.

Regarding the low temperature storage modulus (G') at −25° C. (low temperature), from Table 3 it can be seen that the storage modulus (G') at −25° C. of the silica-rich primary tread cap zone is significantly lower by 12.8 MPa than the storage modulus G' at −25° C. for the lateral carbon black-rich control element zone.

At the low temperature, then, the rubber composition of the primary tread cap zone, with its relatively high polybutadiene rubber content, silica-rich, significantly high reinforcement content, is less stiff than the lateral control element zone in the sense of the dynamic storage modulus G' to thereby promote tire handling for winter conditions.

From Table 2 it can be seen that the storage modulus (G') at 60° C. for the rubber composition of the silica and polybutadiene-rich primary tread cap zone is about 1.6 MPa greater than, or within about 2 MPa, of the storage modulus G' of the lateral carbon black rich rubber composition of the lateral, outboard tread cap zone (element) of the tread cap, thereby representing a suitable control element for the primary tread cap zone.

While certain representative embodiments and details have been shown for the purpose of illustrating the invention, it will be apparent to those skilled in this art that various changes and modifications may be made therein without departing from the spirit or scope of the invention.

What is claimed is:

1. A tire having a rubber tread of a cap/base construction comprised of an outer, zoned rubber tread cap layer having an outer running surface and an underlying internal rubber tread base layer of a unitary rubber composition, wherein said tread cap layer is comprised of two adjoining circumferential, longitudinal tread cap rubber zones of graduated physical properties, wherein said tread cap zones individually extend from the running surface of said tread cap layer radially inward to said tread base layer:

wherein said tread cap zones are comprised of a primary tread cap zone and a lateral, outboard control tread cap zone; wherein said primary tread cap zone spans from 70 to about 85 percent of the axial width of the free running surface of said tire tread cap layer and wherein said lateral, outboard control tread cap zone spans from about 15 to 30 percent of axial width of the free running surface of said tire tread cap layer and is positioned adjacent to and axially outward from said primary tread cap zone;

wherein the storage modulus G' at −25° C., 3 percent strain and 10 Hertz of the rubber composition of said primary tread cap zone is in a range of from about 10 to about 30 MPa and at least about 6 MPa less than such storage modulus G' at −25° C. of said lateral, outboard control tread cap zone which is in a range of from about 25 to about 45 MPa;

wherein the storage modulus G' at 60° C., 3 percent strain and 10 Hertz of the rubber composition of said primary tread cap zone is in a range of from about 3.5 to about 5.5 and within about 2 MPa of such storage modulus G' at 60° C. of said lateral, outboard control tread cap zone which is in a range of from about 2 to about 4 MPa;

wherein the tan delta value at 100° C., 3 percent strain and 10 Hertz of the rubber composition of said lateral, outboard tread cap zone is in a range of from about 0.15 to about 0.35 and at least 10 percent greater than such tan delta value of the rubber composition of said primary tread cap zone which is in a range of from about 0.05 to about 0.25;

wherein the rubber composition of said primary cap zone is comprised of, based on parts by weight per 100 parts by weight rubber (phr) and so long as said storage moduli G' and tan delta values are met:
(A) 100 phr of at least three conjugated diene-based elastomers comprised of:
  (1) about 50 to about 60 phr of cis 1,4-polybutadiene elastomer,
  (2) about 40 to about 50 phr of organic solution polymerization prepared styrene/butadiene elastomers having a bound styrene content in a range of from about 20 to about 40 percent and a vinyl 1,2-content in a range of from about 20 to about 55 percent comprised of a styrene/butadiene elastomer (SBR-1), and amine functionalized styrene/butadiene elastomer (SBR-2), with a weight ratio of said SBR-1 to said SBR-2 in a range of from about 70/30 to about 40/60;
(B) reinforcing filler in a range of from about 90 to about 135 phr comprised of:
  (1) precipitated silica in a range of from about 75 to about 120 phr, and
  (2) rubber reinforcing carbon black in a range of from about 5 to about 15 phr, and
(C) coupling agent for said silica having a moiety reactive with hydroxyl groups contained on the surface of said precipitated silica another moiety interactive with diene-based elastomers;
wherein the rubber composition of said lateral outboard tread cap zone is comprised of, based on parts by weight per 100 parts by weight rubber (phr) and so long as said storage modulus G' values are met:
(D) 100 phr of at least three conjugated diene-based elastomers;
  (1) from 10 to about 40 phr of cis 1,4-polybutadiene elastomer,
  (2) about 60 to about 90 phr of organic solution polymerization prepared styrene/butadiene elastomers having a bound styrene content in a range of from about 20 to about 40 percent and a vinyl 1,2-content in a range of from about 20 to about 55 percent comprised of a styrene/butadiene elastomer (SBR-1), and amine functionalized styrene/butadiene elastomer (SBR-2), with a weight ratio of said SBR-1 to said SBR-2 in a range of from about 70/30 to about 40/60;
(E) reinforcing filler in a range of from about 50 to about 120 phr, wherein the content of said reinforcing filler is at least 10 phr less than the content of reinforcing filler of the rubber composition of said primary tread cap zone, comprised of:
  (1) precipitated silica within a range of from zero to about 45 phr, and
  (2) rubber reinforcing carbon black within a range of from about 30 to about 120 phr, wherein the content of said rubber reinforcing carbon black content is at least 5 phr greater than the content of said aid precipitated silica, and
(F) coupling agent for said silica having a moiety reactive with hydroxyl groups contained on the surface of said precipitated silica another moiety interactive with diene-based elastomers.

2. The tire of claim 1 wherein the rubber compositions of at least one of said primary tread cap zone and lateral outboard tread cap zones contain at least one additional conjugated diene-based elastomer so long as said dynamic storage moduli values at −25° C. and 60° C. and said tan delta (100° C.) values are met.

3. The tire of claim 2 wherein said additional elastomers for at least one of said primary tread cap zone and lateral outboard control tread cap zone are selected from at least one of, so long as said dynamic storage moduli (G') at −25° C. and 60° C. and tan delta (100° C.) values are met, isoprene/butadiene rubber, trans 1,4-polybutadiene, low vinyl polybutadiene having vinyl content in a range of 5 to about 20 percent, high vinyl polybutadiene having a vinyl content in a range of from about 20 to about 90 percent and 3,4-polyisoprene rubber.

4. The tire of claim 1 wherein said amine functionalized styrene/butadiene elastomer (SBR-2) is functionalized with amine substituents comprised of at least one of primary and amine groups.

5. The tire of claim 4 wherein said amine substituents are comprised of at least one secondary amine comprised of an N-methyl amine.

6. The tire of claim 1 wherein tire is designed to be positioned on a vehicle with said lateral, outboard control zone of said tread cap positioned axially outboard of the associated vehicle.

7. The tire of claim 1 wherein the rubber compositions of the tread cap layer composed of said primary tread cap zone and lateral outboard tread cap zone and said tread base rubber layer are an integral tread component in the sense of being co-extruded.

8. The tire of claim 1 wherein the junction of said primary tread cap zone and said lateral outboard control element tread cap zone is positioned within a circumferential groove between said tread cap zones.

9. The tire of claim 1 wherein the axial span of the total running surface of the tread cap layer is up to 15 percent greater than the span of the free running surface of the tread.

10. The tire of claim 1 wherein at least one of said tread cap zones contains from about 1 to about 15 phr of short fibers selected from at least one of glass, polyester, nylon, aramid, carbon, rayon and cotton fibers.

11. The tire of claim 1 wherein at least one of said tread cap zones contains from about 1 to about 5 phr of at least one of particulate inorganic granules and organic granules, in addition to said rubber reinforcing carbon black and said precipitated silica, having an average diameter in a range of from about 50 to about 200 microns.

12. The tire of claim 1 wherein said tread base rubber layer is a single rubber composition comprised of at least one conjugated diene-based elastomer.

13. The tire of claim 12 wherein said tread base rubber layer is comprised of cis 1,4-polyisoprene rubber which contains carbon black in a range of from about 30 to about 70 phr and from zero to about 25 phr of precipitated silica.

14. The tire of claim 1 wherein said coupling agent is:
(A) a bis-(3-triethoxysilylpropyl)polysulfide having an average of from 2 to about 4 connecting sulfur atoms in its polysulfidic bridge, or
(B) a bis-(3-triethoxysilylpropyl)polysulfide having an average of from about 2 to about 2.6 connecting sulfur atoms in its polysulfidic bridge and a bis-(3-triethoxysilylpropyl)polysulfide having an average of from about 3.4 to about 4 connecting sulfur atoms in its polysulfidic bridge, wherein said polysulfide having an average of from 2 to about 2.6 connecting sulfur atoms in its polysulfidic bridge (to the exclusion of such polysulfide having an average of from 3 to 4 connecting sulfur atoms in its polysulfidic bridge) is blended with said rubber composition in the absence of sulfur and sulfur vulcanization accelerator and wherein said polysulfide having an average of from about 3.4 to about 4 connecting sulfur atoms in its polysulfidic bridge is thereafter blended with said rubber composition in the presence of sulfur and at least one sulfur vulcanization accelerator, or (C) an organoalkoxymercaptosilane composition of the general Formula (I) represented as:

$$(X)_n(R_7O)_{3-n}\text{—Si—}R_8\text{—SH} \qquad (I)$$

wherein X is a radical selected from chlorine, bromine, and alkyl radicals having from one through 4, carbon atoms; wherein $R_7$ is an alkyl radical having from 1 through 18 carbon atoms; wherein $R_8$ is an alkylene radical having from one 1 through 4 carbon atoms; and n is an average value of from zero through 3, and wherein in such cases where n is zero or 1, $R_7$ may be the same or different for each ($R_7O$) moiety in the composition, and (D) said organalkoxyomercaptosilane of the general Formula (I) capped with a moiety which uncaps the organoalkoxymercaptosilane upon heating to an elevated temperature.

15. The tire of claim 14 wherein said coupling agent is comprised of an organoalkoxymercaptosilane selected from at least one of triethoxy mercaptopropyl silane, trimethoxy mercaptopropyl silane, methyl dimethoxy mercaptopropyl silane, methyl diethoxy mercaptopropyl silane, dimethyl methoxy mercaptopropyl silane, triethoxy mercaptoethyl silane, tripropoxy mercaptopropyl silane and 3-octanoylthio-1-propyltriethoxysilane.

16. The tire of claim 1 wherein said coupling agent is composite of precipitated silica and said coupling agent.

* * * * *